(12) United States Patent
Maas et al.

(10) Patent No.: US 6,970,396 B2
(45) Date of Patent: Nov. 29, 2005

(54) FIBER-OPTIC SEISMIC ARRAY TELEMETRY, SYSTEM, AND METHOD

(75) Inventors: Steven J. Maas, Austin, TX (US); D. Richard Metzbower, Austin, TX (US); Ian McMillan, Houston, TX (US)

(73) Assignee: PGS Americas, Inc., Houston, TX (US)

( * ) Notice: Subject to any disclaimer, the term of this patent is extended or adjusted under 35 U.S.C. 154(b) by 0 days.

(21) Appl. No.: 11/009,182

(22) Filed: Dec. 10, 2004

(65) Prior Publication Data

US 2005/0122838 A1    Jun. 9, 2005

Related U.S. Application Data

(62) Division of application No. 10/198,615, filed on Jul. 18, 2002, now Pat. No. 6,850,461.

(51) Int. Cl.⁷ .............................................. G01V 1/38
(52) U.S. Cl. ................... 367/20; 367/154; 174/101.5
(58) Field of Search .................. 367/20, 153, 154; 174/101.5

(56) References Cited

U.S. PATENT DOCUMENTS

| | | |
|---|---|---|
| 4,517,456 A | 5/1985 | Halsall et al. |
| 4,628,493 A | 12/1986 | Nelson et al. |
| 4,648,083 A | 3/1987 | Giallorenzi |
| 5,051,965 A | 9/1991 | Poorman |
| 5,231,611 A | 7/1993 | Laznicka, Jr. |
| 5,363,342 A | 11/1994 | Layton et al. |
| 5,589,937 A * | 12/1996 | Brininstool ............ 250/227.14 |
| 5,696,857 A | 12/1997 | Frederick |
| 5,883,857 A * | 3/1999 | Pearce ......................... 367/20 |
| 5,986,749 A | 11/1999 | Wu et al. |
| 6,211,964 B1 * | 4/2001 | Luscombe et al. ...... 250/227.27 |
| 6,219,172 B1 | 4/2001 | Yariv |
| 6,252,656 B1 | 6/2001 | Wu et al. |
| 6,314,056 B1 | 11/2001 | Bunn et al. |
| 6,365,891 B1 | 4/2002 | Hodgson et al. |
| 6,609,840 B2 | 8/2003 | Chow et al. |

FOREIGN PATENT DOCUMENTS

| | | |
|---|---|---|
| GB | 2087680 | 11/1981 |
| GB | 2104752 | 7/1982 |
| GB | 2284256 | 11/1994 |
| JP | 09 0218273 | 2/1996 |

* cited by examiner

*Primary Examiner*—Ian J. Lobo
(74) *Attorney, Agent, or Firm*—E. Eugene Thigpen; Richard A. Fagin

(57) ABSTRACT

A method for attaching seismic sensors in a seismic cable that includes a strength member inside a cable jacket with a fiber tube wound around the strength member and a sensor station base attached around the cable wherein the jacket is removed, at least one fiber tube is extracted and a seismic sensor is attached to the fiber tube.

8 Claims, 6 Drawing Sheets

FIBER-OPTIC SEISMIC ARRAY TELEMETRY, SYSTEM, AND METHOD

CROSS-REFERENCE TO RELATED APPLICATIONS

This application is a divisional application of, and claims priority from, U.S. Nonprovisional patent application Ser. No. 10/198,615, filed on Jul. 18, 2002 now U.S. Pat. No. 6,850,461, the entirety of which is incorporated herein by reference.

STATEMENT REGARDING FEDERALLY SPONSORED RESEARCH OR DEVELOPMENT

Not applicable.

BACKGROUND OF INVENTION

Field of the Invention

This invention relates to seismic cables that are used, for example, in marine and/or land-based seismic data acquisition. Specifically, the present invention relates to fiber-optic seismic cables utilizing dense wavelength division multiplexing (DWDM) and frequency division multiplexing (FDM).

Seismic sensor arrays extend over long distances—sometimes several miles. In such instances, optical fiber sensing of seismic arrays would become economical. However, the prior art optical systems and techniques have performance, reliability and maintenance problems. An example of such WDM/FDM prior art is seen in U.S. Pat. No. 4,648,083 and more recently in U.S. Pat. No. 5,696,857, both of which are incorporated herein by reference. Limitations of the prior art optical systems include: significant attenuation of optical signals passing through telemetry components over long distances and a poor signal-to-noise ratio. A time division multiplexed (TDM) system with input and return bus with optical amplifiers is described in U.S. Pat. No. 6,365,891. Such a system addresses some optical power issues but suffers from many other performance and assembly problems. Further, sensor failure or failure of optical telemetry components, in present fiber-optic seismic cable designs, results in very high repair and maintenance costs. Therefore, there is a need for increasing signal strength, and there is a further need to reduce problems of maintenance and repair.

SUMMARY OF THE INVENTION

According to one aspect of the invention, a seismic cable is provided for optical sensing of seismic sensors, the cable comprising: at least one strength member; a plurality of optical fibers disposed in a plurality of fiber tubes and including at least one input bus telemetry fiber, at least one input distribution telemetry fiber, at least one return telemetry fiber, and at least one return bus telemetry fiber.

According to another aspect of the invention, a FDM/WDM seismic array telemetry system is provided for optical sensing of seismic sensors, the system comprising: an input distribution bus; a return telemetry bus with integral return optical amplifiers; and a telemetry module connected to the input distribution bus and to the return telemetry bus for connection, demultiplexing, remultiplexing and amplifying of signals from the optical sensing seismic sensors.

In still a further aspect of the invention, a method is provided for interrogating seismic sensors in a seismic cable, the seismic cable having a modular sensing stations spaced along the seismic cables and a connection module head end of the sensor section, the method comprising: dropping, at the connection modules, a wavelength of light from a input bus telemetry fiber that includes multiple wavelengths of light, distributing the dropped wavelength of light to the seismic sensors, returning the dropped wavelength to a return telemetry fiber, remultiplexing the dropped wavelength of light onto the return bus telemetry, and amplifying, in the seismic cable, the returned dropped wavelength.

According to still another aspect, a system is provided for interrogating seismic sensors in a seismic cable, the seismic cable having a modular sensing stations spaced along the seismic cables and connection modules at the head end of the sensor sections, the system comprising: means for dropping, at the connection modules, a wavelength of light from an input telemetry bus fiber that includes multiple wavelengths of light, means for distributing the dropped wavelength of light to seismic sensors, means for returning the dropped wavelength to a return telemetry fiber, and means for remultiplexing and amplifying, in the seismic cable, the returned dropped wavelength on a return bus.

In an even further aspect of the invention, a seismic cable is provided comprising: a sensing station, a seismic sensor positioned at the sensing station, a connection module connected to the sensor section, a wavelength drop from a multiple wavelength input telemetry bus fiber, a wavelength distributor from the wavelength drop to the seismic sensor, a wavelength return from the seismic sensor to a return telemetry fiber, and a multiplexer and amplifier on the return bus.

In yet another aspect of the invention, a method is provided for attaching seismic sensors in a seismic cable comprising a main strength member inside a cable jacket, at least one fiber tube wound around the strength member, and a sensor station base attached around the cable, the method comprising: removing the jacket, extracting the at least one fiber tube, and attaching a seismic sensor to the fiber tube.

DETAILED DESCRIPTION OF EXAMPLE EMBODIMENTS

Figure 1:
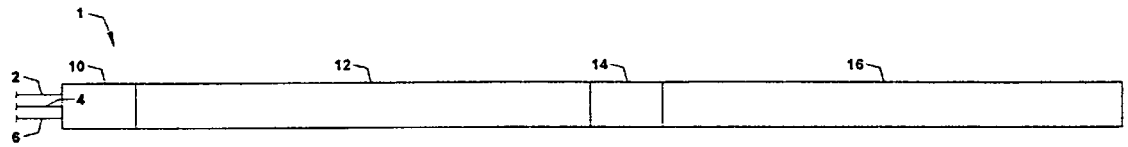
FIG. 1 is a representational view of an example embodiment of the invention.

Referring now to FIG. 1, an example embodiment of a modular fiber-optic cable 1 is seen. In the illustrated example, sensor sections 12 and 16 include seismic sensors (not shown) that generate optical phase signals proportional to the seismic signals being measured. Sensor section 16 is coupled to a connection module 14 where the fiber-optic signals are demultiplexed, distributed, remultiplexed and amplified. Likewise, signals from sensor section 12 are connected through module 10. An optical connector in the module 10 passes light from the front of one section to the aft end of another, carrying signals to and from the sensor sections 12, 16 on input and return busses. Mechanical load of the cable 1 is carried by the termination of a strength member (not shown), for example, a steel wire-rope, in an interconnection between connection modules and sensor sections, as more fully described, below.

Figure 2:
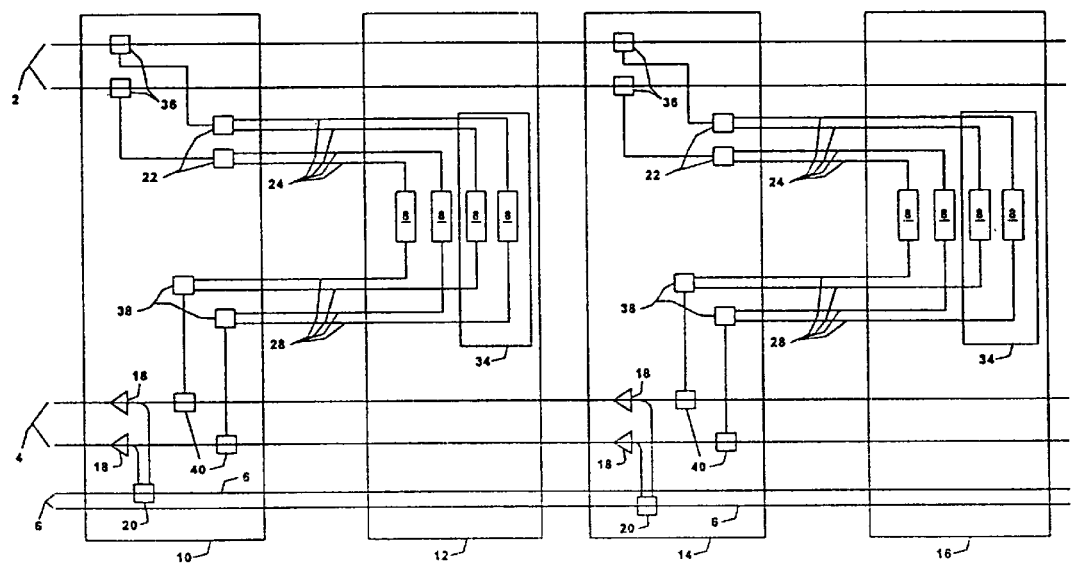
FIG. 2 is a schematic view of an example embodiment of the invention.

Referring now to FIG. 2, a more specific embodiment of the cable of FIG. 1 is seen. To obtain fiber-optic signals from sensor sections 12 and 16, distribution and recombination telemetry 22 and 38 are provided through connection module 10 and 14. Signals in section 16 pass through connection module 14, section 12 and connection module 10. In typical embodiments, many more than two connection modules and sensor sections will be used; and, in such examples, input bus 2 will continue at least to the last connection module 14 in the cable. Input telemetry bus 2, in various embodiments, comprises multiple wavelengths of light modulated at multiple carrier frequencies.

Return telemetry bus 4 is also provided, again through module 10, sensor section 12, and at least to module 14. Laser pump distribution telemetry 6 is provided, again through module 10, sensor section 12, and to module 14, to provide power for amplification in modules 10 and 14 to signals on return telemetry bus 4.

Referring still to FIG. 2, main input telemetry bus 2 includes a number of optical fibers with multiplexed wavelengths (λ), and main return telemetry bus 4 returns laser light that has been passed through the seismic sensors 8. The system also includes a series of cable sections 12 and 16 and telemetry/amplifier modules 10 and 14 through which input telemetry fiber 2 and return telemetry fiber 4 run. In operation, wavelength drops 36 are optically coupled to main input telemetry bus 2 and to section distribution telemetry 22 and distribution fiber 24 for distribution of laser light to sensors 8.

Sensors 8 comprise, in various embodiments, seismic sensors (for example, hydrophones, geophones, accelerometers, other interferometic sensors, Bragg-grating-based sensors, etc.) that are capable of interrogation of signal transmission via fiber optics. For example, see U.S. Pat. Nos. 5,363,342, 5,986,749, and 6,314,056 (all of which are incorporated herein by reference). The signals from the sensors 8 are passed through remultiplexing telemetry 38, added to the return bus using tap coupler 40, and amplified by amplifiers 18 in the modules 10 and 14. According to various embodiments, the amplifiers 18 comprise optically pumped erbium-doped-fiber amplifiers. In a further embodiment, amplifiers 18 comprise waveguide optical amplifiers. The amplifiers 18 offset the loss associated with the combination onto the return bus and passing through connectors.

In the illustrated embodiment, the section connection modules 10 and 14 include main input distribution drops 36 which are optically-coupled in the module to section input distribution telemetry coupler 22 and telemetry fiber 24. Telemetry fiber 24 is passed down the cable inside the fiber tubes and spliced in at the sensor station for input of laser light to optical sensors 8. Also included are section return couplers 38 and return bus couplers 40, optically-coupled to section return telemetry fiber 28. Return telemetry fiber 28 passes down the cable inside a fiber tube and is spliced in at a sensor station for receipt of return laser light. Optical amplifiers 18 are optically coupled in return telemetry 4 and activated by laser pump distribution telemetry 6 to amplify the optical signals from sensors 8.

In typical embodiments, the section connection modules 10 and 14 and the cable sections 12 and 16 are optically-coupled through optical connectors and physically-coupled through strength members (not shown).

In various embodiments, the distribution laser light borne by the main input telemetry is wavelength division multiplexed (WDM). In many embodiments, the distribution laser light borne by the main input distribution telemetry is both wavelength division multiplexed (WDM) and frequency division multiplexed (FDM) (for example, one carrier frequency and a multiplicity of laser wavelengths on each distribution optic fiber). Also in various embodiments, the return laser light borne by the main return telemetry 4 is both wavelength division multiplexed and frequency division multiplexed (WDM/FDM).

In a specific example, the section wavelength drops 36 demultiplex, from the main input telemetry 2, a unique wavelength of distribution laser light for each cable section 12 and 16. The sensors 8 in the particular cable section are all illuminated by the unique wavelength. For example, all of sensors 8 of cable section 12 are illuminated by wavelength $\lambda_1$, and all of sensors 8 of section 16 are illuminated by wavelength $\lambda_2$. The sensors within a particular sensor group 34 in a particular section (e.g., section (16)) are illuminated by a particular carrier frequency. Accordingly, any particular group 34 in section 12 and 16 is illuminated by a unique combination of wavelength and carrier frequency. Group size varies depending on a variety of array design principles known to those of skill in the art.

The section return couplers 38 and the return bus couplers 40 multiplex, onto return optical fibers in the main return telemetry 4, a multiplicity of wavelengths (λ) and carrier frequencies (ω) containing the signals from sensors 8. In the specific embodiment illustrated, the return couplers 38 multiplex, onto each return optical fiber in the return telemetry 4, return laser light output from only one sensor in each sensor group 34.

In some specific embodiments, the passband of a particular wavelength drop is based on the ITU grid of 100 GHz or about 0.8 nanometer; in other embodiments, the passband is narrower or broader. One specific embodiment for the section wavelength drop comprises a 3-port, thin-film filter of the kind sometimes known in the industry as a "drop filter," (for example, those manufactured by Excelight Communication, Inc., of 4021 Stirrup Creek Dr., Durham, N.C. 27703, model number DWDM10C270BCCZ-01, the particular model being a "100 GHz High Isolation WDM filter"). In various specific examples, the filter comprises a dual-stage, single-stage, or any number of filter stages. Isolation of the filter directly affects the crosstalk of the system; dual stage filters typically provide isolation of greater than 40 dB. The high isolation and low loss associated with these types of devices makes them preferred.

According to some examples, the section wavelength drop comprises a fused optical coupler and a Bragg-grating. In other examples, the section wavelength drop comprises an optical circulator and a Bragg-grating. Optical amplifiers are included, in various examples, in an input bus if the array length is such that attenuation over distance becomes higher than can be tolerated.

Typical embodiments of the kind illustrated include a laser source of distribution, multiplexed laser light. In many such embodiments, the laser source comprises a distributed feedback laser. Also, in some such embodiments, the laser source comprises a tunable laser, a fiber laser, or any other narrow linewidth laser source. A carrier frequency is added to the light using an optical phase modulator driven by a frequency synthesizer.

In various embodiments of the kind illustrated in FIG. 2, the return couplers 38 and 40 comprise wavelength-independent fused biconic taper (FBT) coupler; and in some examples, the return coupler 40 comprises an optical circulator and a fiber Bragg-grating.

Figure 3:
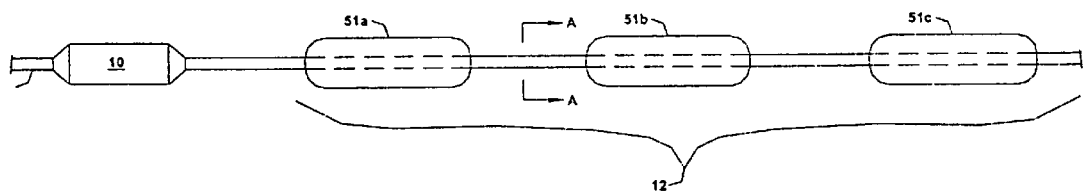
FIG. 3 is a side view of an example embodiment of the seismic cable having modular sensor sections having modular sensing stations spaced along the seismic cable.

Referring now to FIG. 3, an example of a section connection module 10 and sensor section 12 is seen. Sensor section 12 comprises a plurality of sensor station assemblies 51a–51c. Although three assemblies 51a–51c are shown, those of skill in the art will understand that many more or less are used in various alternative embodiments.

Figure 4:
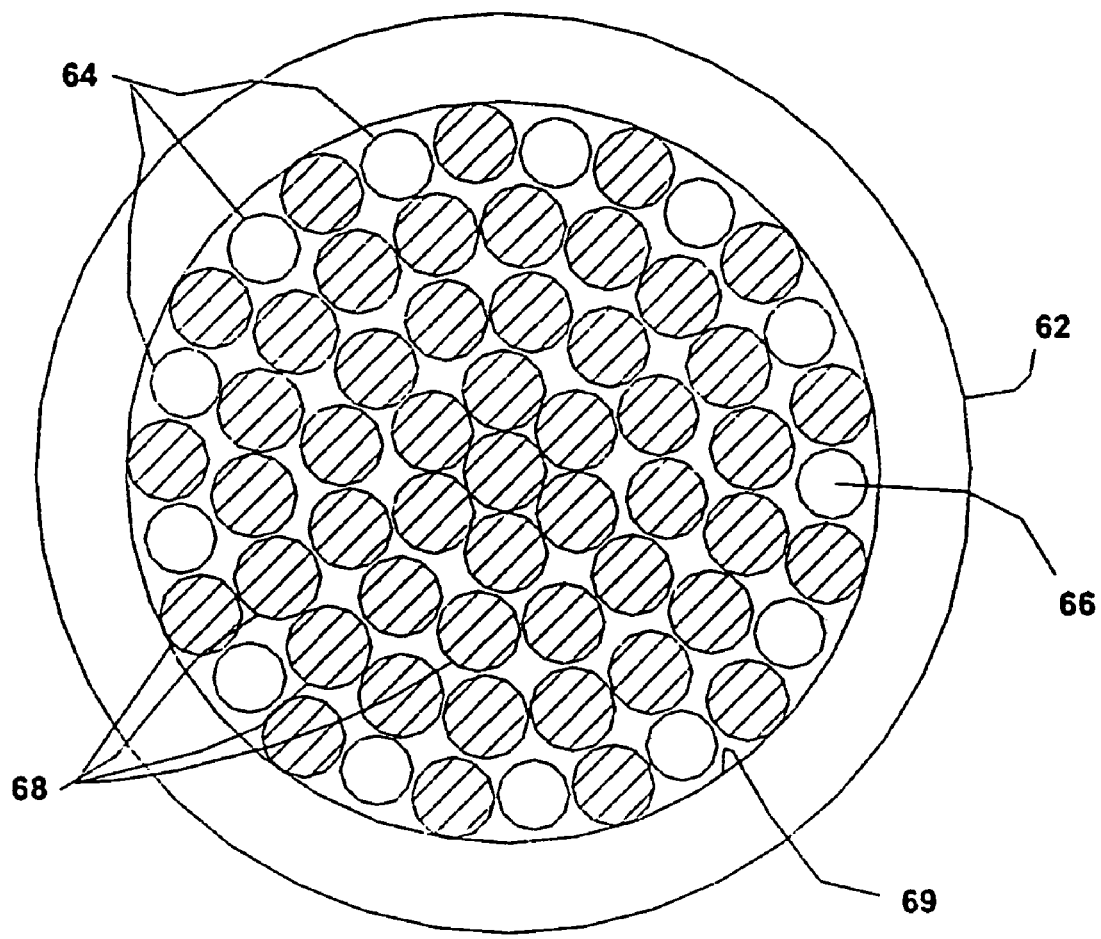
FIG. 4 is a sectional view of an example embodiment of the optical cable.

Referring now to FIG. 4, a cross-section through line A of FIG. 3 is seen of sensor section 12, between sensor station assemblies 51a and 51b. Cable sheath 62 surrounds optical fiber tubes 64, each of which holds a plurality of optic fibers 66 (used, for example, for the various functions described with reference to the earlier figures). Fiber tubes 64 are disposed between the interior 69 of cable sheath 62 and strength members 68 (which take mechanical loads of dragging or towing of the cable off fibers 66 and other non-load-bearing components). According to various examples, a first fiber tube 64 may house the input telemetry fiber 2, while another tube houses return telemetry 4, and still another houses amplifier pump fiber 6, leaving the remaining tubes to connect the sensor stations to throughout the sensor section 12.

Placement of fiber tubes 64 near the interior surface 69 of the cable jacket 62 facilitates installation of sensor-station assemblies 51 (FIG. 3). Fiber tubes 64 are easy to extract; and, therefore, individual optical fibers 66 are easily extracted from particular tubes 64. Cutting of strength members 68 when sensor-station assemblies 51 are connected is avoided by placement of fiber tubes 64 between jacket 62 and strength members 68. Cable termination hardware at each sensor station is thus avoided, representing a substantial savings in hardware and labor cost in seismic cables.

Figure 5A:
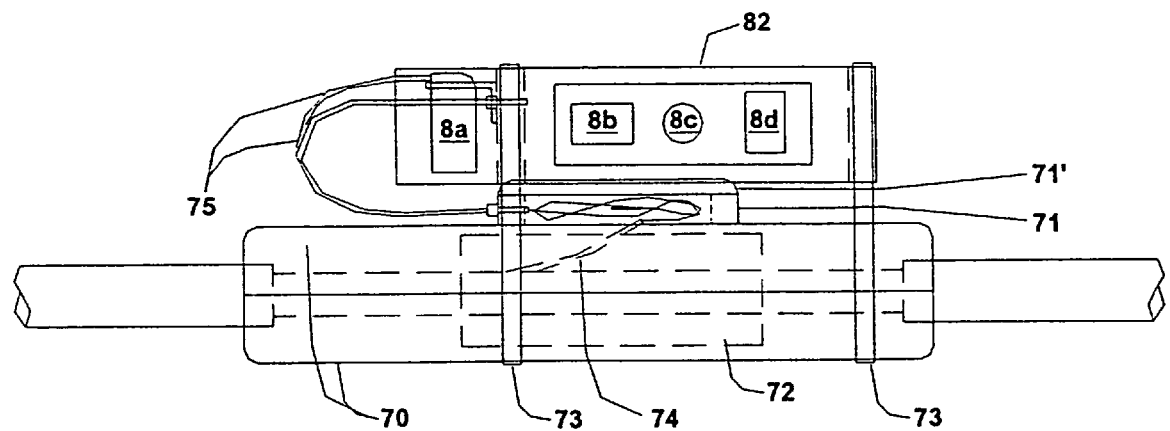
FIGS. 5a and 5b are a perspective view of an example embodiment of a modular sensor station breakout.
Figure 5B:
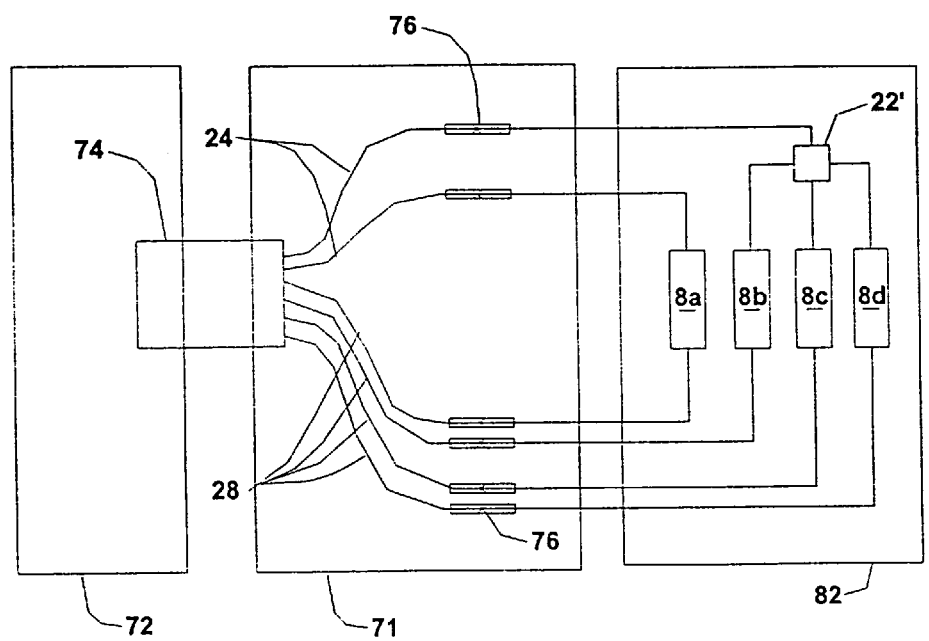

Referring now to FIGS. 5a and 5b, an example embodiment of sensor station 51 (FIG. 3) is seen. Cable jacket 62 (FIG. 4) is removed and the appropriate fiber tube 64 (FIG. 4) is extracted. The pad base 70 is attached and epoxied into place 72. A splice housing 71 is opened through cover 71' to access the fibers from the tube 74 which make up system distribution telemetry fiber 24 and return telemetry fiber 28. Fusion splices 76 are used in various examples connecting sensors 8 to distribution telemetry fiber 24 and return telemetry fiber 28 and to the module components distribution telemetry 26 and return telemetry 30.

In the specific embodiment shown in FIGS. 5a and 5b an additional telemetry distribution coupler 22' is used to further distribute laser light to sensor 8b–8d. Sensors 8 are held in a sensor housing 82, which is then held to the splice housing 71, for example, by straps 73. While two straps are shown, of course other straps and alternative means of attachment of sensor housing 82 are used in various embodiments. This assembly technique greatly maximizes the reliability and simplifies any rework, because only optical splices are included in the section that can be damaged; the telemetry components are collocated in a module and not distributed throughout the array sections. Should a channel go down, the splice tray is easily opened and a new sensor housing is spliced in. The manufacture of sensor housing 72 and sensors 8 is performed according to various methods that will occur to those of skill in the art, depending on the particular environment of use for which the sensor are intended. Potting material (not shown) and seals, for example, are used in some water-tight, high-pressure embodiments.

It should also be noted that FIGS. 5a and 5b illustrates an example embodiment in which there are multiple sensor taps per connection modules. In other words, the modular section served by connection module 10 (FIGS. 1, 3) comprises multiple sensor stations, and the fiber tubes 64 (FIGS. 4, 5a, and 5b). Once a group of fibers are terminated to a group of sensors they are not used again in that section. As shown in FIG. 5b six optical fibers are connected to the sensor station. However, in some cases, a tube contains extra fibers that are connected to another sensor station, (e.g., additional fibers that need to be passed through one sensor station to get to another. Therefore, multiple stations are run through the same fiber tube, in some example embodiments of the invention, and at a further sensor station (e.g., 51b of FIG. 3), another fiber tube (FIG. 4) is used.

According to still another alternative embodiment (not shown), there is a single connection module 10 for all sensor stations 51a in a section 12, thus reducing the fibers required for passing the laser light to and from the section to only those needed to hold the main distribution telemetry 2, the main return telemetry 4, and in the case of remote amplifier pumping the laser pump drive 6. This greatly simplifies the optical connector requirement in the system.

Figure 6B:
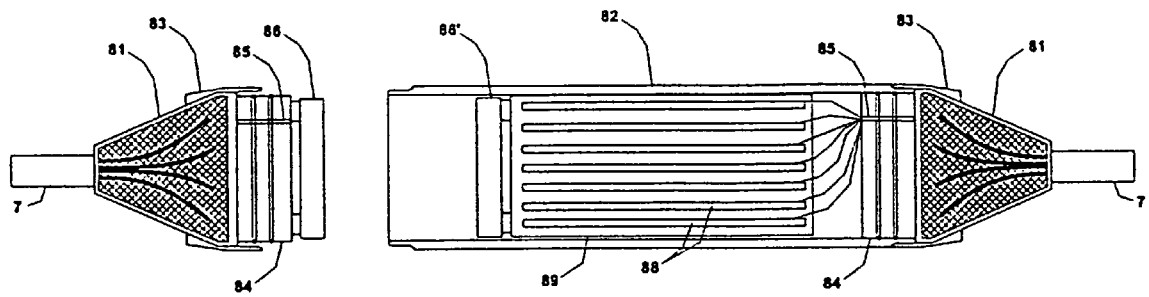
FIGS. 6a and 6b are a side view, in mated and unmated configurations, respectively, of an example embodiment of the telemetry module.
Figure 6A:
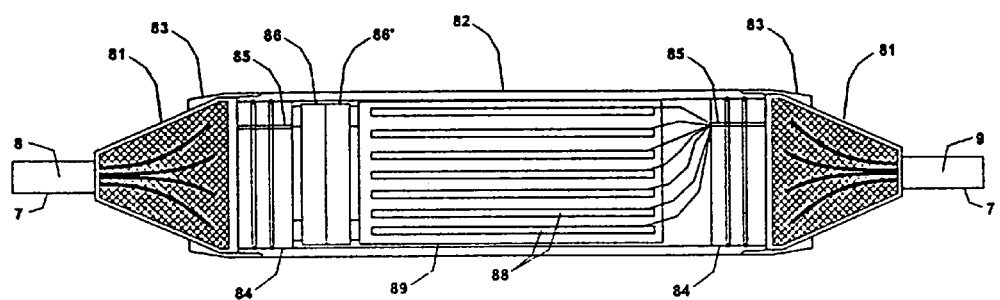

Referring now to FIGS. 6a and 6b, a specific example embodiment of a connection module 10 (FIGS. 1, 3) is shown in mated and unmated configurations, respectively. Optical cable 7 connects to strength termination member 81 on each end of connection module housing 82 through locking rings 83. Module pressure barriers 84 isolate the interior of housing 82 and are penetrated by fiber pressure feed-throughs 85. On one end of the interior housing 82, optical connection inserts are attached via standoffs from pressure barriers 84 and connect optical cable 8 to optical storage trays 88 which are mounted in tray support brackets 89. Storage trays 88 connect on the other end via fusion splicing, or other means, to filter and telemetry components. The mounting brackets 89 are attached to the pressure bulkhead 84.

Figure 7:
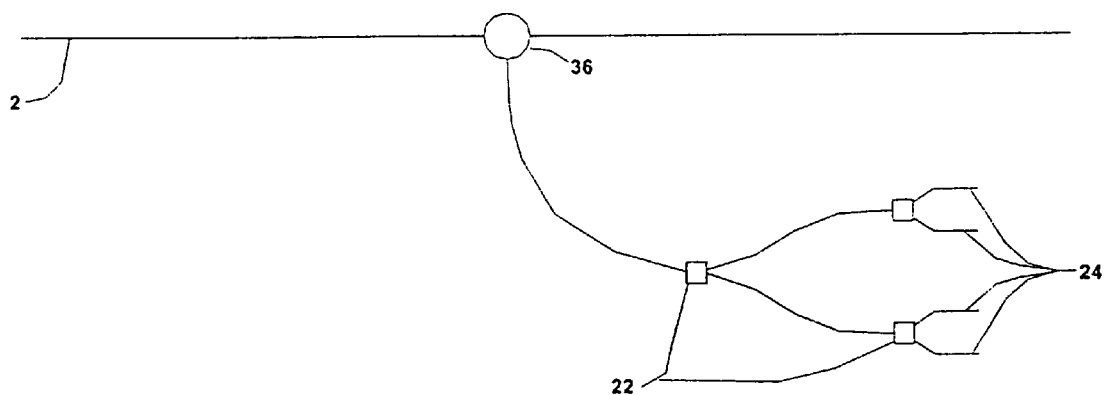
FIG. 7 is a schematic view of an example embodiment of the drop and distribution of a wavelength of light.

A schematic of example distribution telemetry held on a tray 88 is seen in FIG. 7, where a multiple wavelength signal is provided on fiber 2. A thin-film filter-drop 36 takes a wavelength that is then split by 50/50 distribution couplers 22 to supply interrogation signals for sensors 8 (FIGS. 2, 5) via distribution fibers 24. The number of splits is dependent on array configurations and performance known to those skilled in the art.

Figure 8:
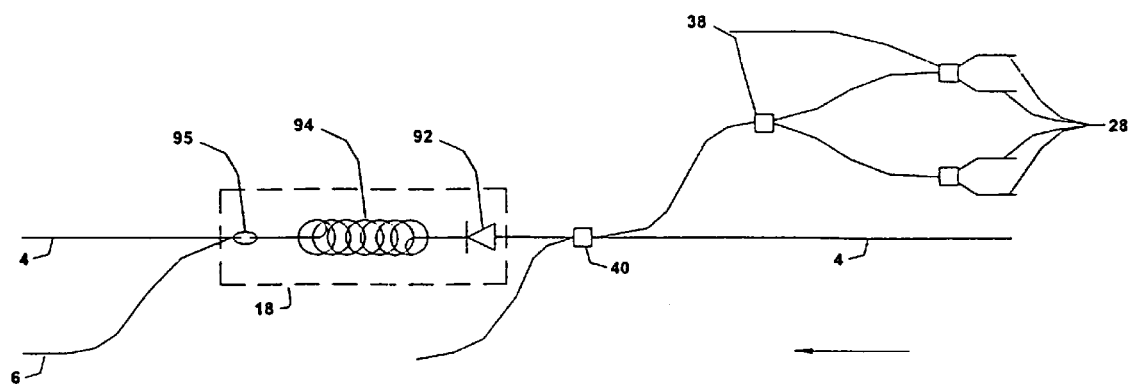
FIG. 8 is a schematic view of an example embodiment of the return multiplexing, coupling onto the return buss and amplifying the optical signals.

FIG. 8 shows a schematic of an example return telemetry held on a tray 88 (FIG. 6). In the illustrated example, 50/50 return couplers 38 receive signals from sensors 8 (FIGS. 2, 5) via return fibers 28. A return tap coupler 40 then couples the signals to return fiber 4. An erbium-doped fiber 94, pumped via a WDM 95 and using a 1480 laser pump signal on pump fiber 6 amplify the return, multiplexed signal. An optical isolator 92 is provided to keep unwanted light from getting into the sensors.

Figure 9:
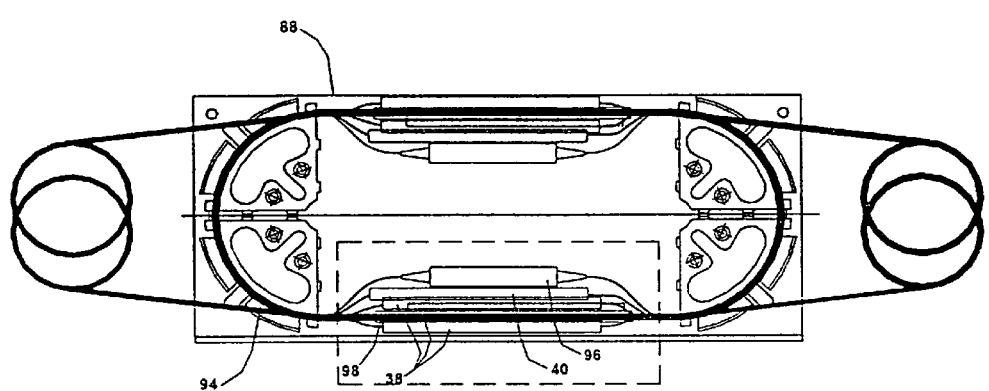
FIG. 9 is a top view of an example embodiment of a component storage tray in the telemetry module.

As seen in FIG. 9, according to a specific example, a storage tray 88 stores the optical components and fiber from the devices shown in FIGS. 7 and 8 using, for example, an Europlus EFA0404D1 fiber-storage reel. In the case of FIG. 8, Erbium-doped optical fiber 94, return multiplex couplers 38, main return bus couplers 40, optical isolator 92, and 1480/1500 WDM coupler 95, are all mounted to tray 88. Such trays 88 hold four amplifiers per tray (two per side). Similarly the all components of FIG. 7 are stored on a tray.

Figure 10:
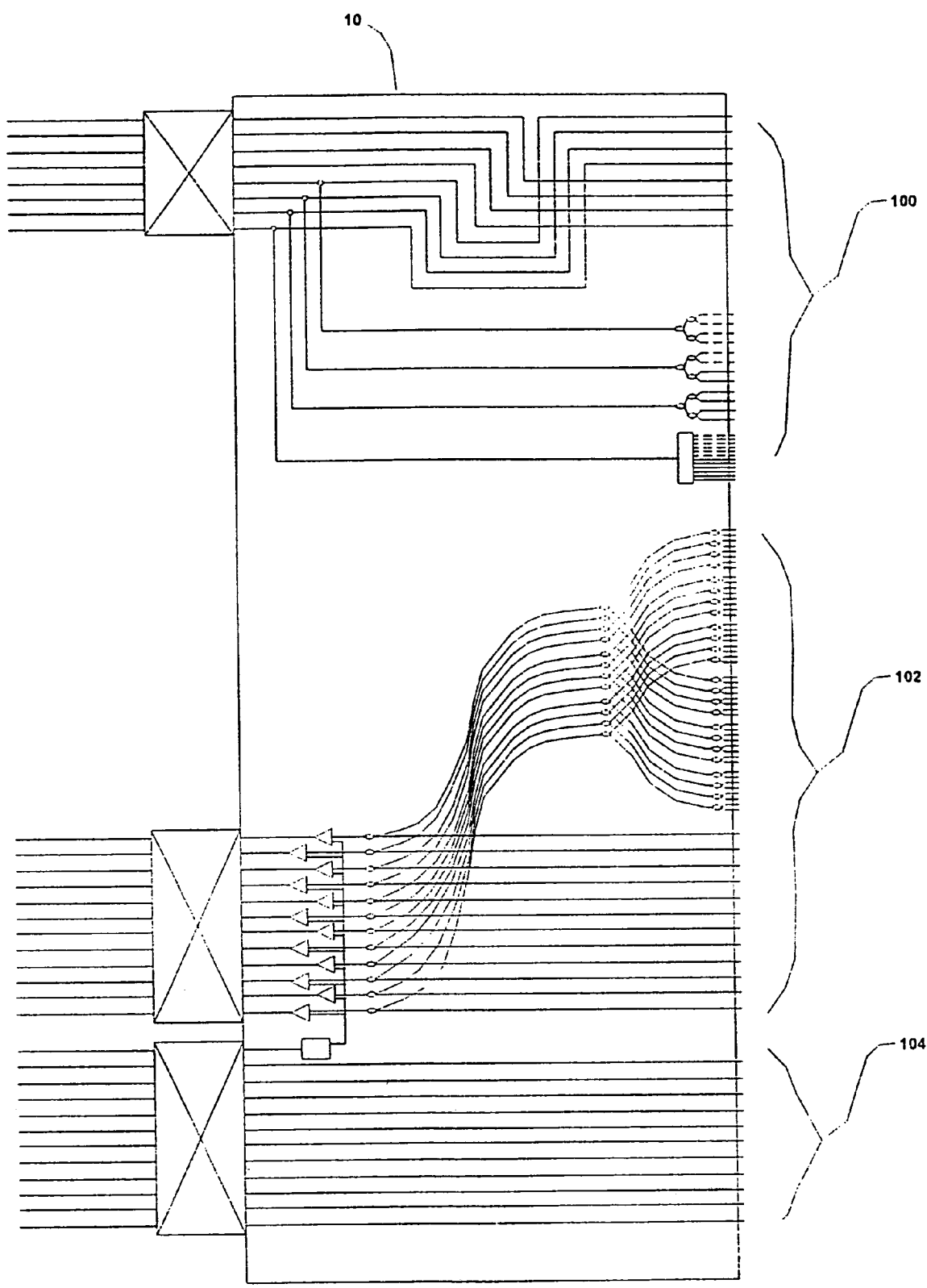
FIG. 10 is a schematic view of an example embodiment of the optical multiplexing in the telemetry module.

Referring now to FIG. 10, an example of the configuration of the connections used in an entire connection module 10 to house the above optics, where drop distribution 100 resides on a storage tray (or trays) in the same connection module 10 as return/amplification components 102 and pump optics 104, on different trays. This greatly simplifies the construction and assembly steps used in the optical array.

In a specific assembly process, return telemetry couplers are mounted to a tray, followed by a main return bus coupler, an optical isolator, erbium-doped fiber, and WDM coupler. Fiber length between components is maintained to avoid excess fiber loops and to keep the various components collocated. Optical power is monitored during assembly to insure splices have acceptable losses.

In a specific assembly embodiment of 1×4 return telemetry couplers, data on each of the four couplers is monitored, and the coupler showing the best uniformity from the monitoring is used for the main return bus coupler. Of the three remaining couplers, the one showing the next best uniformity is used for the tray base, which is then spliced into a laser source for measurement of outputs. A splice of the outputs is then made to the input of the two remaining couplers, and their outputs are also monitored to ensure splice quality.

In some embodiments, heat-shrink splice protection is used with a micro-protection sleeve. Components are taped into the tray and cutback measurements are made to verify losses on the leads. A 1550 nm source is spliced into a coupler lead in the direction of travel for the amplifier chain; optical power is measured exiting the base coupler for quality control. Next, a main return bus 50/50 coupler is spliced on, and optical power is again measured. Then, an optical isolator is spliced in and power is again measured. A WDM coupler is then spliced in, and output of the coupler is measured for quality control.

The assembly of the wavelength drop of a tray is performed in a similar process, using, for example, a thin-film filter or other drop components replacing the amplifier and return bus coupler. A particular benefit of such process is the ease of connection of an assembled tray to an optical cable. Various embodiments of narrow-band wavelength drops (for example, thin-film filters with three ports) provide several technical benefits, including improved isolation between channels.

A comparison of main distribution fibers to section fibers is performed, in some embodiments; the section fibers contain not only the drop wavelength but also low levels of the other wavelengths distributed in a system, this makes up the system crosstalk. That crosstalk level is much smaller in the 3-port filter configuration because of the higher isolation than it is for other embodiments, comparable performance has been achieved with other embodiments but with a significant price penalty. A specific type of noise dealt with by this embodiment includes a kind of crosstalk from other wavelengths, as opposed to thermal, ASE, polarization-induced, or other noise types.

Typical drop filter components be it thin film filters or single circulator and grating provide about 30 dB isolation, while a single-fused coupler gives only about 15 dB. A new generation of relatively inexpensive dual-stage, thin-film filters, such as those mentioned above from Excelight communications, gives some embodiments more than 40 dB of isolation. In some embodiments, the standard components are ganged or cascaded to achieve better isolation results or noise performance; however, ganging couplers incurs additional hardware expense.

Narrower bandwidth in various embodiments allows for more channels, or more wavelengths of distribution light, in a passband (such as, for example, the passband of Erbium-doped fiber-type optical amplifiers). The Erbium bandwidth is about 30–70 nanometers, centered on about 1550 nanometers. More channels in the band means more wavelengths per fiber, more optical sensors (more channels per array), fewer distribution and return fibers per optical sensor or channel, fewer contacts on each connector, less fiber in the cable, much less hardware overall, and much less expense for the same sensing capacity. For example, traditional FDM sensing is achieved through a 12×12 array with one wavelength of distribution light that gives 144 channels. Example embodiments of the present invention, on a 12×12 array, yield 12×12×N wavelengths or 144×N channels.

Further technical benefits of various embodiments include improved filtering and improved exclusion of all "other" optical noise. Less crosstalk means less noise and narrow bandwidth mean more channels. Thin-film filters or Bragg-gratings typically can be made to yield a single transmission/reflection bandwidth of less than a nanometer (0.8 nm is a telecommunications standard) somewhere in the Erbium spectrum. Fused couplers have narrow bandwidths at a wavelength of interest, but fused couplers also pass so many other wavelengths in the Erbium spectrum as to result in much poorer overall noise performance compared to thin-film filters or circulators with Bragg-gratings.

Embodiments in which drops are modular and wavelength-specific results in optical sensor sections modular and non-wavelength-specific. Seismic cable sections and module in typical embodiments are installed literally anywhere in an array having thousands of sensors, completely plug-compatible at any location in the entire array. Adding the wavelength drops to the module make a section wavelength specific. In some example embodiments, the drops are used as a type of program plug for the section in the array. Switching the program plug allows for a section to be used anywhere.

In the illustrated embodiments, pump laser light for amplification is provided by remote pumping (for example, in a cable truck or marine vessel). However, in alternative embodiments, each connection module includes a separate laser source for the amplifier. In various such embodiments, power for the pump is supplied through the cable by a power line or batteries in the connection modules, according to two power supply examples. In this case pump wavelengths of 980 nanometers could also be used.

Modularity greatly reduces the expense and difficulty of field repairs, since optical sensor cables are typically many kilometers in length. It is very difficult to treat an entire cable as a single unit for repair. It is much more efficient to identify a section of the cable as defective, than simply replace the defective section by unplugging it in its entirety and plugging in another identical wavelength-independent cable section and adding the drops for a single wavelength into a single section connection module makes for simple, convenient, and inexpensive troubleshooting and field repair of large optical sensor arrays.

The above description has been given by way of example only; other embodiments and further benefits will occur to those of skill in the art upon review of the present specification without departing from the spirit or scope of the invention as defined herein.

What is claimed is:

1. A method for attaching a seismic sensor to a seismic cable, the cable comprising a strength member disposed inside a jacket and at least one optical fiber disposed in a tube, the tube disposed inside the jacket and externally to the strength member, the method comprising:

removing a portion of the jacket at a selected position along the cable;

extracting the at least one fiber and the tube therefor;

affixing a splice housing to the exterior of the cable in the position where the jacket has been removed;

operatively coupling the at least one fiber to the seismic sensor; and affixing the seismic sensor to the splice housing.

2. The method of claim 1, further comprising:

extracting, from the tube, a distribution fiber and a return fiber, and operatively coupling the seismic sensor to the distribution and return telemetry fiber.

3. The method of claim 1 wherein the affixing the seismic sensor to the splice housing comprises band clamping a seismic sensor housing to the exterior of the splice housing.

4. The method of claim 1 wherein the operatively coupling comprises opening a cover in the splice housing and fusion splicing the at least one fiber to a corresponding fiber in the seismic sensor.

5. A method for attaching a seismic sensor to a seismic cable, the cable comprising a strength member disposed inside a jacket and a plurality of optical fibers disposed in respective tubes, the tubes disposed inside the jacket and externally to the strength member, the method comprising:

removing a portion of the jacket at a selected position along the cable;

extracting at least one fiber and the respective tube therefor;

affixing a splice housing to the exterior of the cable in the position where the jacket has been removed;

operatively coupling the at least one fiber to the seismic sensor; and affixing the seismic sensor to the splice housing.

6. The method of claim 5, further comprising:

extracting, from the respective tube, a distribution fiber and a return fiber, and operatively coupling the seismic sensor to the distribution and return telemetry fiber.

7. The method of claim 5 wherein the affixing the seismic sensor to the splice housing comprises band clamping a seismic sensor housing to the exterior of the splice housing.

8. The method of claim 5 wherein the operatively coupling comprises opening a cover in the splice housing and fusion splicing the at least one fiber to a corresponding fiber in the seismic sensor.

* * * * *